United States Patent
Pottiez et al.

(10) Patent No.: US 8,857,249 B2
(45) Date of Patent: Oct. 14, 2014

(54) DUAL DIAPHRAGM COMBUSTION PRESSURE MEASURING DEVICE

(75) Inventors: Christian Pottiez, Eppingen (DE); Bernd Last, Reutlingen (DE); Georg Rixecker, Leinfelden-Echterdingen (DE); Martin Sackmann, Benningen (DE)

(73) Assignee: BorgWarner BERU Systems, GmbH, Ludwigsburg (DE)

( * ) Notice: Subject to any disclaimer, the term of this patent is extended or adjusted under 35 U.S.C. 154(b) by 294 days.

(21) Appl. No.: 13/215,008

(22) Filed: Aug. 22, 2011

(65) Prior Publication Data

US 2013/0047716 A1  Feb. 28, 2013

(51) Int. Cl.
*G01M 15/08* (2006.01)
*G01L 23/24* (2006.01)

(52) U.S. Cl.
CPC ...................................... *G01L 23/24* (2013.01)
USPC ...................................................... 73/114.18

(58) Field of Classification Search
CPC ......... G01L 7/08; G01L 7/082; G01M 15/08; G01M 15/09
USPC ................ 73/114.16, 114.18, 114.19, 114.21
See application file for complete search history.

(56) References Cited

U.S. PATENT DOCUMENTS

| | | | |
|---|---|---|---|
| 5,726,351 A | 3/1998 | Glaser | |
| 7,635,826 B2 * | 12/2009 | Yamada et al. | 219/270 |
| 2005/0252297 A1 | 11/2005 | Heinzelmann et al. | |
| 2006/0053875 A1 | 3/2006 | Haussner et al. | |
| 2007/0095811 A1 | 5/2007 | Last | |
| 2007/0245805 A1 | 10/2007 | Schricker et al. | |
| 2008/0302323 A1 * | 12/2008 | Kern et al. | 123/145 A |
| 2009/0320576 A1 | 12/2009 | Borgers et al. | |
| 2011/0056925 A1 * | 3/2011 | Haussner et al. | 219/270 |
| 2011/0146393 A1 | 6/2011 | Last et al. | |

FOREIGN PATENT DOCUMENTS

DE  10 2007 049 971 A1  4/2009
WO  WO 2006/072514 A1  7/2006

* cited by examiner

*Primary Examiner* — Eric S McCall
(74) *Attorney, Agent, or Firm* — Hackler Daghighian & Martino

(57) ABSTRACT

A pressure measuring device includes a housing and a rod which is movable in the axial direction in the housing under the effect of combustion chamber pressure where the rod protrudes from the housing. A sensor measure combustion chamber pressure acting on the rod, and a first diaphragm is attached to the housing through which the rod extends. A second diaphragm is attached to the housing through with the rod extends between the sensor and the first diaphragm. The second diaphragm generates a return force when the rod undergoes axial displacement caused by pressure on the rod.

16 Claims, 5 Drawing Sheets

DUAL DIAPHRAGM COMBUSTION PRESSURE MEASURING DEVICE

The invention relates to a pressure measuring device for measuring combustion chamber pressure in a motor. Such pressure measuring devices may be integrated in glow plugs. A pressure measuring device designed as a glow plug is known from DE 10 2004 024 341 B3, for example.

In the case of glow plugs comprising a sensor for measuring combustion chamber pressure, axial mobility of the heating rod relative to the housing must be given, and the housing must be sealed with respect to combustion chamber gasses. These requirements can be met using a sealing diaphragm which is attached to the housing, and through which the heating rod extends. Such a diaphragm is typically connected via brazing, soldering or welding to both the heating rod and the housing, although it may also be designed as an integral part of the housing. A metal diaphragm attached to both the heating rod and the housing permits the heating rod to move axially under the effect of combustion chamber pressure, and can easily withstand the chemical and thermal loads of combustion chamber gasses.

The pressure in the combustion chamber of an engine changes to an extreme extent during one working cycle. These changes occur in succession in very short time intervals according to the engine speed, and therefore the measurement of combustion chamber pressure is characterized by large pressure fluctuations that occur in succession in very short time intervals.

A problem addressed by the present invention is that of demonstrating a way to measure combustion chamber pressure in the engine of a motor vehicle with high precision.

SUMMARY OF THE INVENTION

In the case of a pressure measurement device according to the invention, the pressure sensor is protected against combustion gasses by two diaphragms which are arranged one behind the other viewed in the longitudinal direction of the rod. The rear diaphragm is protected against combustion gasses by the front diaphragm on the combustion-chamber side, and is thereby decoupled from thermal influences of combustion.

A pressure measurement device according to the present invention may be a glow plug by the axially moveable rod being a heating rod. However, this is not necessary. Diesel engines may be provided with a separate glow plug in addition to a pressure measurement device. For gasoline engines no glow plug is needed.

Within the scope of the invention it was recognized that, in the case of conventional pressure measuring glow plugs, the sealing diaphragm enclosing the heating rod can form a considerable source of interference signals that negatively affect measurement accuracy. Specifically, the sealing diaphragm is heated to a great extent by combustion chamber gasses during fuel combustion and cools down during the time remaining in a working cycle of the engine. These strong temperature fluctuations are associated with fluctuating thermal expansions and therefore induce short-duration mechanical loads in the diaphragm. These mechanical loads are transferred to the heating rod, and so the temperature fluctuations of the diaphragm can induce axial motions of the heating rod.

Thermally induced motions of the rod and pressure-induced motions are converted by the pressure sensor into measurement signals. The force exerted by thermal expansions of the diaphragm on the rod thus induces an interference signal that is superposed on the actual measured quantity, specifically the force exerted by the combustion chamber pressure on the heating rod.

In the case of a pressure measuring device according to the invention and comprising two diaphragms arranged one behind the other, the rear diaphragm—as seen from the combustion chamber—can be protected against temperature shocks by the front diaphragm. The front diaphragm therefore makes it possible to thermally insulate the rear diaphragm against combustion chamber gasses. The rear diaphragm therefore reacts to short-duration temperature fluctuations associated with fuel ignition to a substantially lesser extent, at most. Due to the combination of two diaphragms according to the invention, it is therefore possible, overall, to reduce the effects of short-duration temperature fluctuations on the heating rod.

The second diaphragm, i.e. the rear diaphragm as seen from the combustion chamber, preferably has lower elasticity than the first diaphragm. The elasticity determines the correlation between force and expansion. The effect of a given force on the first diaphragm therefore induces a greater expansion than the effect of a force of equal magnitude does on the second diaphragm. The second diaphragm is therefore harder than the first diaphragm; in this case, the expressions "soft" and "hard" should be understood in the same sense as used to describe springs.

When the rod undergoes axial displacement, a return force is generated, to which the first diaphragm and the second diaphragm contribute in the case of a glow plug according to the invention. Given that the first, i.e. combustion chamber-side, diaphragm has greater elasticity than the second diaphragm, the influence of the first diaphragm on the motion of the heating rod and, therefore, the measurement signal can be reduced even further. Specifically, the higher the elasticity of the first membrane is, the smaller the forces are that can be generated as the consequence of thermal expansion when a temperature shock occurs. Preferably, the elasticity of the second diaphragm is not more than half, particularly preferably not more than one-fifth, and in particular not more than one-tenth the elasticity of the first diaphragm.

Preferably, the first diaphragm is thinner than the second diaphragm, preferably not more than half as thick. The elasticity of a diaphragm is dependent on the thickness thereof and on the material that is used. Suitable materials for the first diaphragm are nickel-based alloys in particular. Nickel-based alloys that are resistant to high temperature are commercially available as alloy 718 and alloy 725, for example. In addition, nickel chromium steels, in particular high-temperature steels such as 1.4541 or 1.4571, are also suitable, for example, as material for the first diaphragm.

The sensor used to measure combustion chamber pressure being applied to the rod can be acted upon with pressure directly by the rod. Preferably, however, the sensor is acted upon with pressure by a force transmitter enclosing the rod. The force transmitter is disposed in the housing and is attached to the rod, as a ring, coil, or tube, for instance. An axial motion of the rod is transferred to the force transmitter attached thereto, which then acts upon the sensor.

Using such a force transmitter, the influence of thermal shocks on the pressure signal can be advantageously reduced further. Specifically, the force transmitter can act as a spring that generates a return force upon displacement of the rod. Preferably, the force transmitter generates a return force when the rod undergoes pressure-induced displacement that is greater than the return force of the first diaphragm generated by this displacement. Preferably, the force transmitter generates a return force when the rod undergoes pressure-induced displacement that is less than the return force of the second diaphragm that is generated.

According to an advantageous refinement of the invention, the housing is assembled of at least two housing parts, wherein a front, i.e. combustion-chamber side, housing part encloses the second diaphragm, and a rear housing part encloses the sensor.

BRIEF DESCRIPTION OF THE DRAWINGS

Further details and advantages of the invention are explained using embodiments, with reference to the attached drawings. Advantages that are identical or similar are labelled using the same reference numerals.

In the drawings.

DETAILED DESCRIPTION

Figure 1:
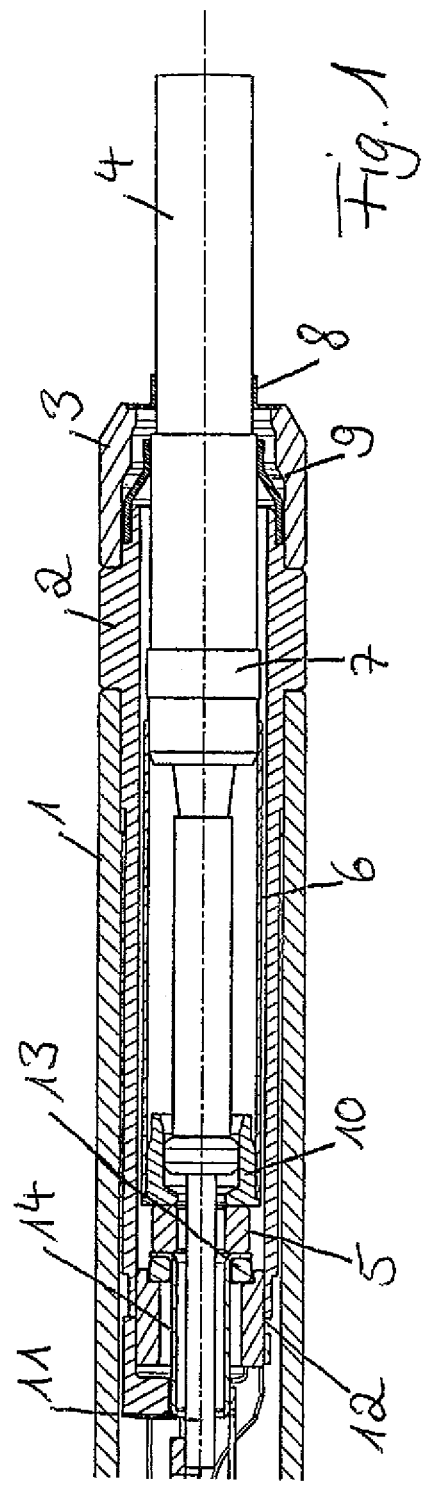
FIG. 1 shows a schematic depiction of an embodiment of a glow plug.

An example of a pressure measurement device in the form of a glow plug is depicted schematically in a side view in FIG. 1. The glow plug has a multiple-component housing 1, 2, 3, out of which a heating rod 4—which can move in the axial direction under the effect of combustion chamber pressure—protrudes. The greater the combustion chamber pressure is, the further heating rod 4 is pressed into the housing.

A sensor 5 for measuring combustion chamber pressure acting on heating rod 4 is disposed in the housing. Pressure sensor 5 converts a force exerted thereupon into an electrical signal. In the embodiment shown, sensor 5 is a piezoelectric sensor. Other sensors can also be used to measure pressure, e.g. strain gauges.

Sensor 5 is acted upon with pressure by a force transmitter 6 in the form of a tube enclosing heating rod 4. Force transmitter 6 is attached to heating rod 4, using a welding sleeve 7, for example.

Sensor 5 is protected against combustion chamber gasses by two sealing diaphragms 8, 9 disposed one behind the other. In the embodiment shown, a first diaphragm 8 is disposed on the end of the housing closest to the combustion chamber. Second diaphragm 9 is disposed between sensor 5 and first diaphragm 8. First diaphragm 8 and second diaphragm 9 are connected to heating rod 4 in a bonded manner, by brazing, soldering or welding, for example. In the embodiment shown, diaphragms 8, 9 are designed as separate components and are connected to the housing on the outer edge thereof, by brazing, soldering or welding, for example.

First diaphragm 8 is exposed to hot combustion chamber gasses which bring about short-duration temperature fluctuations of several hundred degrees. These temperature fluctuations are associated with thermal expansions which can result in force acting on heating rod 4. These forces are that much lower the more elastic first diaphragm 8 is.

In the embodiment shown, first diaphragm 8 is therefore more elastic than second diaphragm 9. This means that first diaphragm 8 generates a lesser return force than second diaphragm 9 does when heating rod 4 undergoes axial displacement. To achieve this, first diaphragm 8 can be designed thinner than second diaphragm 9, for example, and/or can be made of a more elastic material. Nickel-based alloys in particular combine relatively high elasticity with good temperature resistance.

First diaphragm 8 and second diaphragm 9 act as springs that react to a pressure-induced displacement of heating rod 4 with a return force. For a given displacement, the return force generated by second diaphragm 9 is greater than the return force generated by first diaphragm 8. In the embodiment shown, the return force generated by second diaphragm 9 is more than ten times, specifically more than twenty times, as large as the return force generated by the first diaphragm. Second diaphragm 9 therefore forms a spring that has a spring hardness that is more than ten times, even more than twenty times greater than that of the spring formed by first diaphragm 8.

Force transmitter 6 can form a further spring that generates a return force upon axial displacement of heating rod 4. The spring hardness of this further spring should be greater than the spring hardness of the spring formed by first diaphragm 8. In the embodiment shown, force transmitter 6 generates a return force upon a given axial displacement of heating rod 4 that is less than that of second diaphragm 9, and is greater than the return force then generated by first diaphragm 8.

In the embodiment shown, the housing consists of a front housing part 3, a rear housing part 1, and an intermediate piece 2 joined to the front and the rear housing part. First diaphragm 8 is attached to front housing part 3, second diaphragm 9 is attached to intermediate piece 2. Front housing part 3 encloses second diaphragm 9.

The design shown in FIG. 1 enables the glow plug to be assembled easily. Since intermediate piece 2 carries sensor 5, it can be joined thereto and to heating rod 4 to form one assembly. Second diaphragm 9 can be attached to heating rod 4 and intermediate piece 2 with minor effort. Next, intermediate piece 2 is connected to rear housing part 1 and to front housing part 3.

A stopper 10 which encloses an inner pole 11 extending to heating rod 4 can be disposed between force transmitter 6 and sensor 5. Sensor 5 is held in intermediate piece 2 by a cap 12 through which inner pole 11 and sensor contacts 14 are routed. An insulating ring 13 can be disposed between cap 12 and sensor 5.

Figure 2:
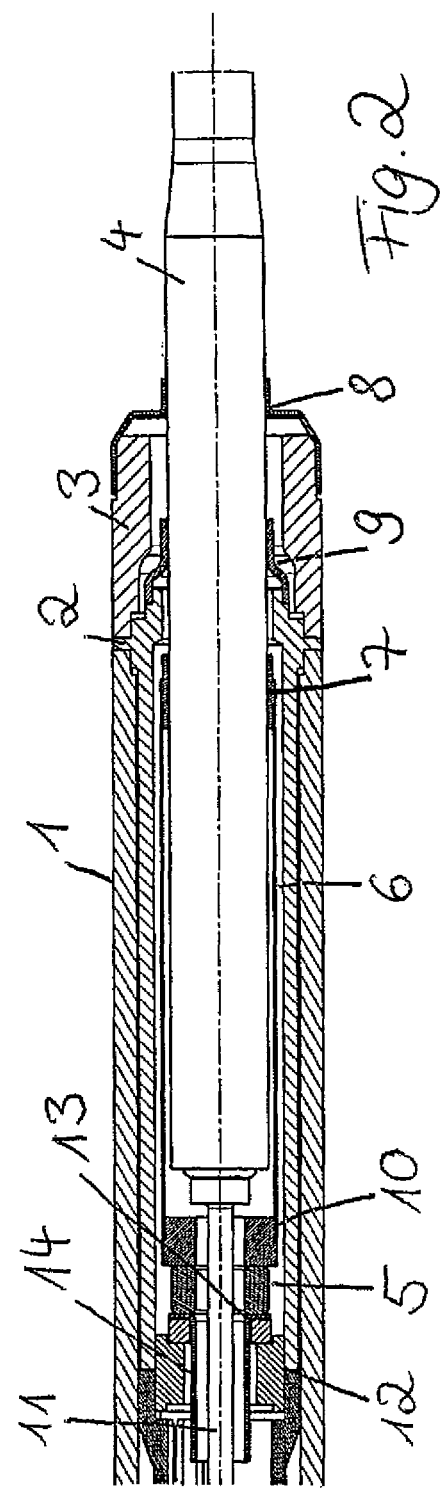
FIG. 2 shows a schematic depiction of a further embodiment of a glow plug.

FIG. 2 shows another embodiment of a glow plug. This embodiment differs from the embodiment presented in FIG. 1 mainly only by the design of first diaphragm 8. In the embodiment shown in FIG. 1, first diaphragm 8 is attached to an end face of the housing. Diaphragm 8 therefore has an approximately L-shaped cross section. In the embodiment presented in FIG. 2, however, first diaphragm 8 extends to a lateral surface of the housing. First diaphragm 8 can therefore cover a conical sealing seat of the glow plug. It is therefore possible to attain a good thermal connection of first diaphragm 8 to a cooling system of the engine, thereby reducing the thermal load on first diaphragm 8.

Figure 3:
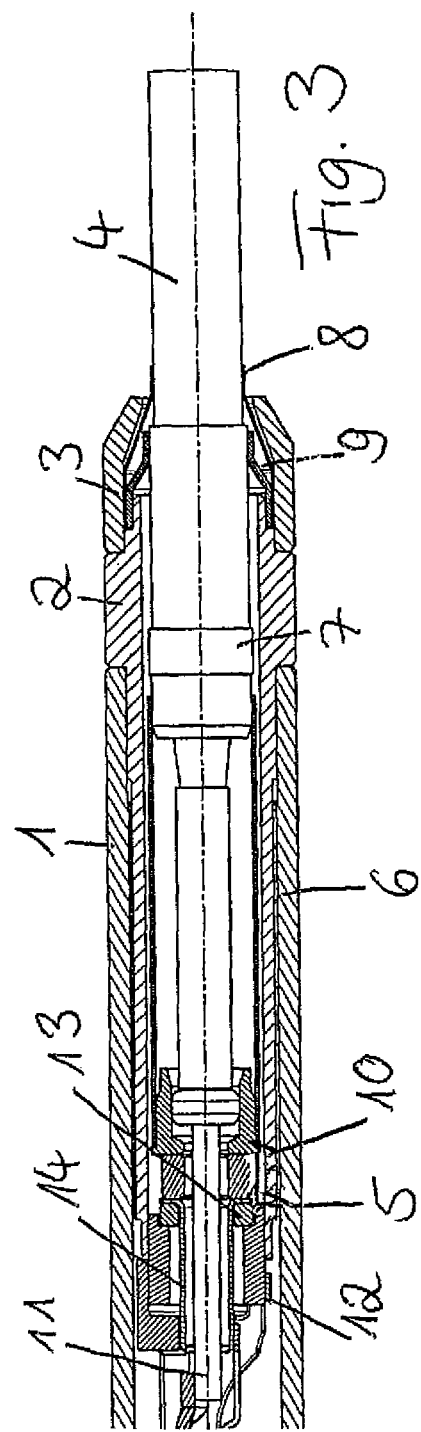
FIG. 3 shows a schematic depiction of a further embodiment of a glow plug.

FIG. 3 shows another embodiment of a glow plug, in the case of which both first diaphragm 8 and second diaphragm 9 are enclosed by the housing. First diaphragm 8 and second diaphragm 9 can form a double diaphragm. In the embodiment depicted in FIG. 3, as in the above-described embodiments, an open space exists between first diaphragm 8 and second diaphragm 9.

Figure 4:
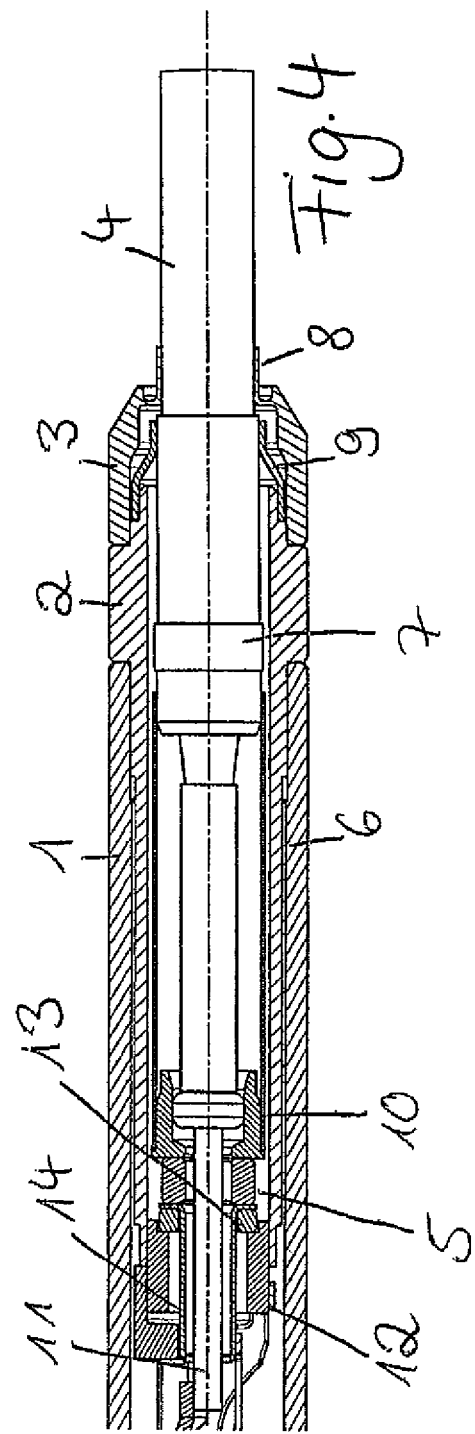
FIG. 4 shows a schematic depiction of a further embodiment of a glow plug.

FIG. 4 shows another embodiment of a glow plug, which differs from the embodiment shown in FIG. 1 mainly only in that first diaphragm 8 is formed as a single piece with the front part of the housing.

In the embodiment shown in FIG. 3, front diaphragm 8 is protected against damage by front housing part 3. This advantage is offset by the disadvantage of possible coking, however. Coking can restrict the mobility of the heating rod, thereby hindering and corrupting the pressure-measuring function. Coking can be caused by soot deposits on cold components. An increased risk of coking exists in high exhaust gas recirculation systems in particular, which are often used in modern combustion systems. In the embodiments depicted in FIGS. 1, 2 and 4, however, coking is practically ruled out.

Figure 5:
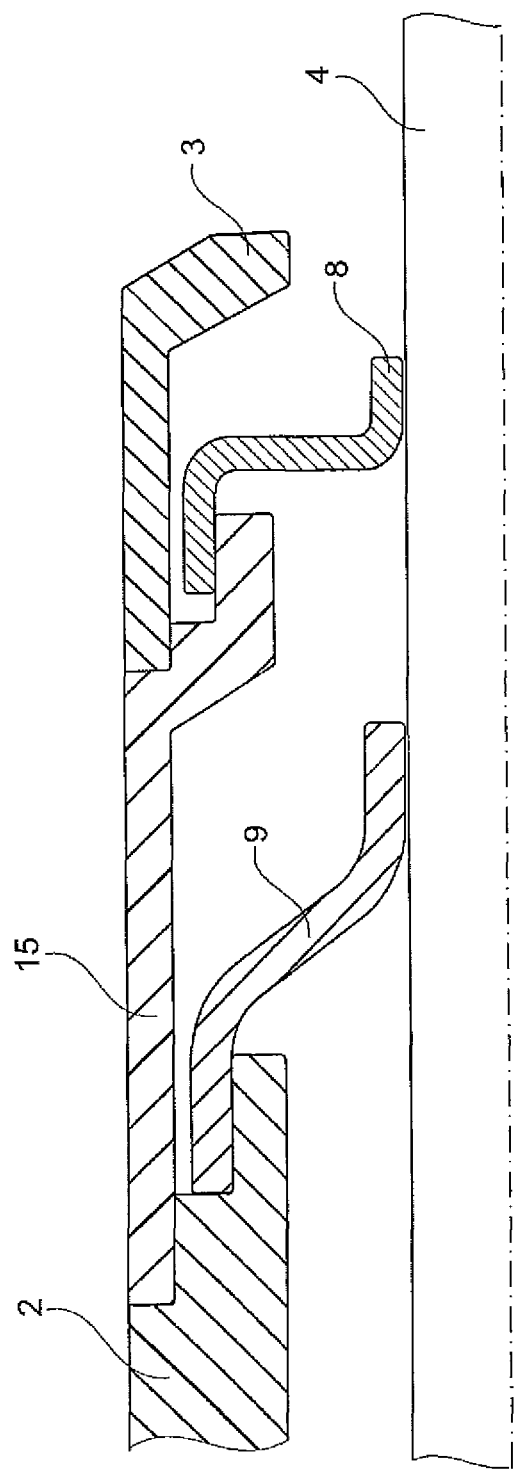
FIG. 5 shows a schematic depiction of a further embodiment.

FIG. 5 shows another embodiment of a glow plug in a schematic depiction. In this embodiment, a second intermediate piece 15 is provided, which connects intermediate piece 2 to front housing part 3. In this embodiment, further intermediate piece 15 carries first diaphragm 8, and intermediate piece 2 carries second diaphragm 9.

REFERENCE NUMERALS

1 Rear housing part
2 Intermediate piece
3 Front housing part
4 Rod
5 Sensor
6 Force transmitter
7 Welding sleeve
8 First diaphragm
9 Second diaphragm
10 Stopper
11 Inner pole
12 Cap
13 Insulation ring
14 Sensor contact
15 Further intermediate piece

What is claimed is:

1. A pressure measuring device comprising:
a housing and a rod which is movable in an axial direction in the housing under the effect of combustion chamber pressure and which protrudes from the housing;
a sensor for measuring combustion chamber pressure acting on the rod;
a first diaphragm attached to the housing and through which the rod extends; and
a second diaphragm disposed between the sensor and the first diaphragm, said second diaphragm generating a return force when the rod undergoes axial displacement caused by pressure on the rod,
wherein the second diaphragm comprises a lower elasticity compared to the first diaphragm.

2. The pressure measuring device according to claim 1, wherein the pressure measuring device comprises a glow plug, and wherein the rod is a heating rod of the glow plug.

3. The pressure measuring device according to claim 1, wherein a front part of the housing encloses the second diaphragm.

4. The pressure measuring device according to claim 1, wherein both the first and the second diaphragm are connected in a gas-impermeable manner to the rod and the housing.

5. The pressure measuring device according to claim 1, wherein the elasticity of the second diaphragm is not more than half of the elasticity of the first diaphragm.

6. The pressure measuring device according to claim 1, wherein the elasticity of the second diaphragm is not more than one-fifth of the elasticity of the first diaphragm.

7. The pressure measuring device according to claim 1, wherein the elasticity of the second diaphragm is not more than one-tenth of the elasticity of the first diaphragm.

8. The pressure measuring device according to claim 1, wherein a force transmitter enclosing the rod is disposed in the housing, is attached to the rod, and acts on the sensor, the sensor converting a force exerted thereupon, by the force transmitter, into an electrical signal.

9. The pressure measuring device according to claim 8, wherein the force transmitter is a tube.

10. The pressure measuring device according to claim 8, wherein the force transmitter generates a return force when the rod undergoes pressure-induced displacement, said return force being less than a return force which is thereby generated by the second diaphragm.

11. The pressure measuring device according to claim 1, wherein the housing is assembled of a front housing part, a rear housing part, and at least one intermediate piece connecting the front and the rear housing parts.

12. The pressure measuring device according to claim 11, wherein the intermediate piece carries the second diaphragm.

13. The pressure measuring device according to claim 11, wherein the intermediate piece carries the sensor.

14. A pressure measuring device comprising:
a housing;
a rod extending through the housing and movable in an axial direction in the housing when under the effect of combustion chamber pressure;
a sensor configured for measuring combustion chamber pressure acting on the rod;
a first diaphragm attached to the housing and through which the rod extends; and
a second diaphragm disposed between the sensor and the first diaphragm, wherein the first and second diaphragms generate a return force when the rod undergoes axial displacement caused by pressure on the rod, wherein the return force of the second diaphragm is at least twice as high as the return force for the first diaphragm.

15. The pressure measuring device of claim 14, wherein the return force of the second diaphragm is at least five times as high as the return force for the first diaphragm.

16. The pressure measuring device of claim 14, wherein the return force of the second diaphragm is at least ten times as high as the return force for the first diaphragm.

* * * * *